United States Patent [19]

Kelly, Jr.

[11] Patent Number: 4,505,624
[45] Date of Patent: Mar. 19, 1985

[54] CLAMPING TOOL

[76] Inventor: Kenneth W. Kelly, Jr., 1824 Burnett Rd., Topeka, Kans. 66604

[21] Appl. No.: 540,275

[22] Filed: Oct. 11, 1983

[51] Int. Cl.³ .............................................. B23Q 1/00
[52] U.S. Cl. ..................................... 408/109; 269/91; 269/99; 269/71; 269/208; 269/249
[58] Field of Search ..................................... 269/91-94, 269/99-100, 71, 164, 208, 249, 246; 408/103, 107-109, 90-92

[56]  References Cited
U.S. PATENT DOCUMENTS

| 1,395,353 | 11/1921 | Osterholm | 408/109 |
| 2,559,716 | 7/1951 | Gaudreau | 269/93 |
| 3,027,158 | 3/1962 | Barbee | 269/71 |
| 3,066,930 | 12/1962 | Chinnick | 269/71 |
| 3,298,157 | 1/1967 | Klein | 269/93 |
| 3,353,578 | 11/1967 | Kalkanis | 269/54 |
| 3,993,297 | 11/1976 | Tokunaga | 269/71 |

FOREIGN PATENT DOCUMENTS

| 196319 | 3/1908 | Fed. Rep. of Germany | 269/164 |
| 273155 | 4/1951 | Switzerland | 269/71 |

Primary Examiner—Robert C. Watson
Attorney, Agent, or Firm—Schmidt, Johnson, Hovey & Williams

[57] ABSTRACT

A tool for clamping a workpiece on a table or comparable support while work is being performed on the workpiece has a pair of elongated arms, one below the table and the other, when in use, above the table. The vertically spaced arms are swingable in horizontal planes about spaced, vertical axes, the axis of swinging movement of the lower arm being beneath the table. An upright post secured to the lower arm in spaced relationship to the table, and extending upwardly from the lower arm, swingably supports one end of the upper arm. A screw carried above the table by the upper arm at its opposite end is movable downwardly to a position clamping the workpiece onto the upper surface of the table.

7 Claims, 4 Drawing Figures

U.S. Patent  Mar. 19, 1985  4,505,624
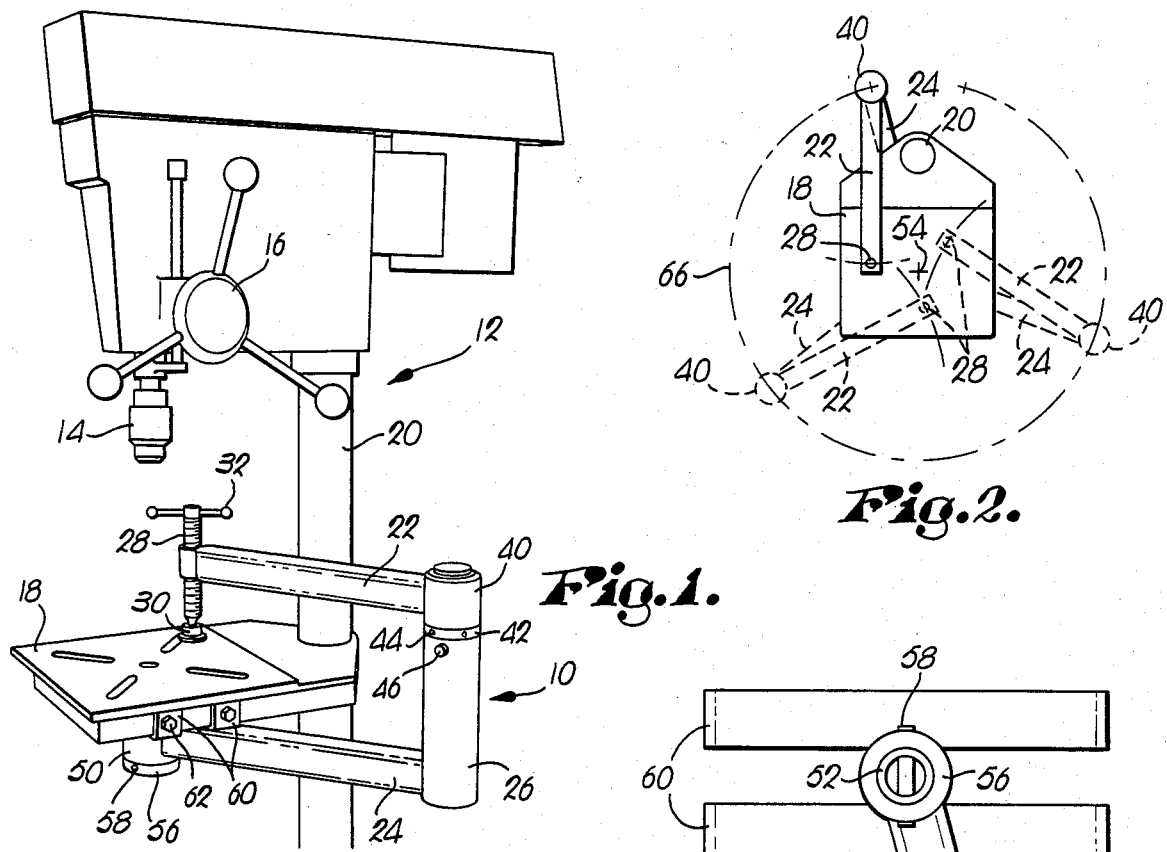
Fig.1.
Fig.2.
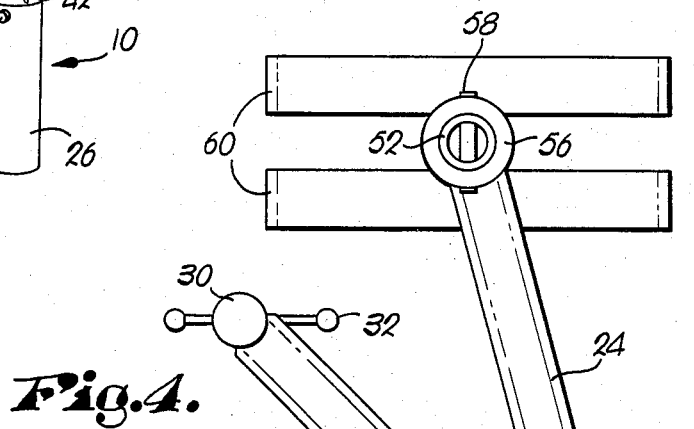
Fig.4.
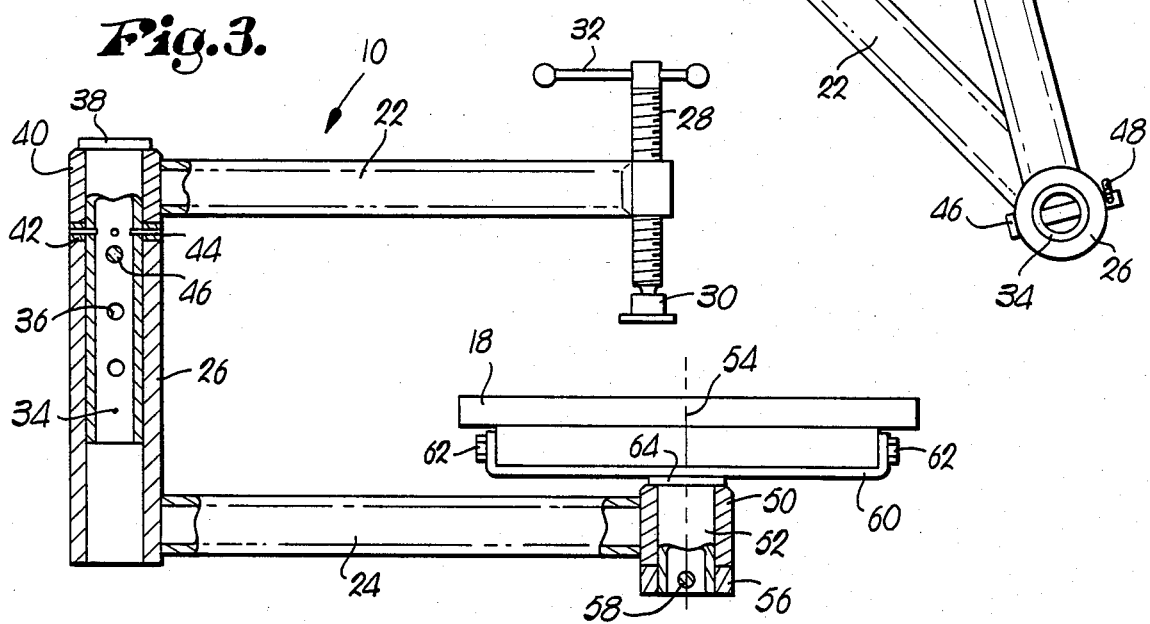
Fig.3.

CLAMPING TOOL

Safe securement of workpieces in place while cutting, drilling and performing other operations thereon has been a long existing problem heretofore unsolved and, especially because of the dangers involved, there remains a dire need for a satisfactory solution. Workmen generally have resorted to various, makeshift paraphernalia, accessories, apparatus and equipment in an effort to reduce the dangers and assure accurate machining or other functions, most of which is time consuming in use and difficult to apply, much less safe.

Whenever any kind of boring, broaching, chamfering, grooving or other cutting operation is performed, the slightest movement of the workpiece so machined detracts from precision and oftentimes results in waste. More importantly however, unsteady workpieces can spin, break, splinter or fly away while being cut, placing the workman in a dangerous environment, including loss of sight, fingers or limbs, as well as facial injuries.

The problems are solved through use of my improved clamping tool which is handily positioned adjacent the workpiece table always ready to permit rapid and easy application to almost any and all types of workpieces and in connection with numerous kinds of operations to be performed. Swingable from out of the way storage to a position overlying the workpiece, a clamping screw is carried by the uppermost of a pair of arms having the table disposed therebetween when the clamping tool is in use.

The arms are pivoted for swinging about separate, spaced apart, vertical axes, and an upright post, spaced from the table and interconnecting the arms, has an adjusting feature for varying the height of the screw above the table. The tool is releasably carried by the table of the drill press or other machine, or by a workbench when hand tools are to be employed.

In the drawing:

FIG. 1 is a perspective view of a clamping tool made according to my present invention, shown attached to a drill press;

FIG. 2 is a schematic view showing certain of the possible positions of various parts;

FIG. 3 is a side elevational view thereof shown attached to the table; and

FIG. 4 is an enlarged, inverted view of the tool.

Chosen for illustration of a manner of using a safety clamping tool 10 made according to my present invention is a motorized drill press 12 having a bit holding chuck 14 and a handle 16 for moving the chuck 14 and the bit toward and away from a workpiece on a horizontal table 18 extending radially from and carried by a vertical column 20.

The tool 10 includes a pair of elongated, horizontal arms 22 and 24 (spaced from the table 18) and an elongated, tubular, vertical post 26 spanning the distance between the arms 22 and 24 at their outermost ends, together with a clamping screw 28 at the inner end of the arm 22.

The arm 22 is internally tapped for receiving the external threads of the screw 28, and a foot 30 is universally swivelled on the lower end of the screw 28. A rotatable handle 32 is reciprocable transversely of the screw 28 at its upper end.

The post 26 is rigid to the outer end of the arm 24 and rises above the table 18 in horizontally spaced relationship thereto. It has an elongated tube 34 therein provided with a series of vertically spaced holes 36, together with a top cap 38. A sleeve 40, rigid to the outer end of the arm 22 is interposed between the cap 38 and a collar 42. Both the sleeve 40 and the collar 42 surround the tube 34 with the sleeve 40 rotatable on the tube 34. The collar 42, interposed between the sleeve 40 and the upper end of the post 26, has a number of radial fasteners 44 extending into the tube 34. A cross pin 46 traversing the post 26 and the tube 34, and adapted to be received in any one of the opposed pairs of holes 36 in the tube 34, has a removable key 48 at one of its ends.

The arm 24 has an outer tube 50 secured to its inner end and rotatable on an inner tube 52 about a vertical axis 54 aligned with the axis of rotation of the bit (not shown) depending from the chuck 14. A collar 56 surrounds the tube 52 below the tube 50 and is secured to the tube 52 by a radial cross fastener 58. The vertical, longitudinal axis of the screw 28 is always offset horizontally from the axis 54 when the screw 28 is above the table 18, clearing the bit for drilling of holes in the workpiece (not shown) supported on the table 18. The arm 24 extends radially from both the post 26 and the tube 50, the arm 22 extends radially from the sleeve 40 and the longitudinal axes of the post 26, the tube 34 and the screw 28 are parallel with the axis 54.

A pair of spaced, U-shaped straps 60 beneath the table 54 are secured thereto by fasteners 62 and are medially rigid to a cap 64 which is, in turn, rigid to the upper end of the tube 52, the cap 64 being interposed beneath the straps 60 and the upper end of the tube 50.

OPERATION

The arm 24 is horizontally rotatable just short of 360° about the axis 54, interrupted only by the column 20, as shown in FIG. 2 by arcuate, dashed line 66, whereas the arm 22 may be rotated horizontally a full 360° about the axis of the post 26, uninterrupted by the bit depending from the chuck 14, when the arm 24 is in the two positions, for example, shown by dotted lines in FIG. 2.

By swinging the arm 22, the arm 24 or both, the screw 28 can be placed in any desired position over a workpiece on the table 18 and, by use of the handle 32, the screw 28 turned to move the foot 30 down tightly against the workpiece, clamping it to the table 18 in position for drilling a hole therein by a bit held in place by the chuck 14.

As demonstrated by FIG. 2, there is virtually no area on the top surface of the table 18 which is inaccessible by the screw 28, even adjacent any one of the four corners of the table 18. Thus, multitudes of different types of workpieces of varying sizes and shapes can be quickly, easily, firmly and safely held in place while work is being formed thereon. In this connection, my invention is not limited in its use to drill presses; any support camparable to the table 18, whether on a machine for performing other types of work or as a part of a workbench may be adapted to receive the arm 24, by use of the straps 60 or other mount.

Moreover, as needed or desired, jigs, fixtures and the like may be employed for supporting the workpiece on the table, depending on the configuration of the workpiece, such as tubes, rods and other round stock, T-bars, L-shaped pieces and those of nonuniform or assymetrical shapes, whether of metal, wood, plastic or other substances. In all events, when my tool 10 is properly and carefully used, injury to the workman is virtually eliminated; the workpiece can be caused to be held in place such that it cannot turn, twist or become displaced during machining or other operation, even during possible malfunction of the machine or its cutting tools.

Turning of the screw 28 to its upper limit will permit large stock to be placed between the table 18 and the foot 30. If greater spacing is needed, removal of the crosspin 46 permits raising of the tube 34, the collar 44, the sleeve 40 and the arm 22, whereupon the crosspin 46 is inserted through another pair of diametrically opposed holes 36 in the tube 34.

I claim:

1. In combination with a workpiece-supporting table of a drill press for drilling holes in the workpiece, a tool for clamping the workpiece to the table, said tool comprising:

an elongated, lower arm having one end thereof beneath the table and extending outwardly beyond the latter;

an elongated post having a vertical longitudinal axis and rigidly secured at the lower end of the post to the arm at the opposite end of the latter, said post extending upwardly from the arm and having an upper end disposed above a horizontal plane through the table;

journal means under the table at said one end of the arm securing the arm to the table for swinging movement within a horizontal plane below the table through an arc but slightly less than 360 degrees;

an elongated, upper arm having a clamping device mounted thereon at one end of the upper arm; and pivot means at said upper end of the post attaching the upper arm at the opposite end of the latter to the post for swinging movement within a horizontal plane spaced above the table through a 360 degree arc, said planes and the longitudinal axes of the arms being in spaced parallelism, said axis being parallel with the axes of swinging movement of the arms, said device being movable to and from a position overlying the table upon swinging movement imparted to the upper arm.

2. The invention of claim 1, said post being tubular, structure supporting the pivot means and disposed for vertical reciprocation in the post; and means releasably interconnecting the post and the structure for holding the latter at any one of a number of preselected heights.

3. The invention of claim 2 wherein said press has a chuck for holding a bit in depending relationship thereto above the table, said device being offset relative to the bit when the device is in said position, clearing the bit for movement toward and away from the workpiece.

4. The invention of claim 3; structure between the table and the journal means secured to the latter; and releasable means attaching the structure to the table.

5. The invention of claim 1, said device including a vertical screw having an actuating handle and a work-engaging foot.

6. The invention of claim 1 wherein said press has a chuck for holding a bit in depending relationship thereto above the table, said device being offset relative to the bit when the device is in said position, clearing the bit for movement toward and away from the workpiece.

7. The invention of claim 1; structure between the table and the journal means secured to the latter; and releasable means attaching the structure to the table.

* * * * *